United States Patent
Xu et al.

(10) Patent No.: US 11,720,235 B2
(45) Date of Patent: Aug. 8, 2023

(54) METHOD AND APPARATUS FOR BROWSING TABLE IN DOCUMENT, AND ELECTRONIC DEVICE AND STORAGE MEDIUM

(71) Applicant: BEIJING BYTEDANCE NETWORK TECHNOLOGY CO., LTD., Beijing (CN)

(72) Inventors: Yu Xu, Beijing (CN); Yixin Pan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/693,251

(22) Filed: Mar. 11, 2022

(65) Prior Publication Data

US 2022/0197455 A1    Jun. 23, 2022

Related U.S. Application Data

(63) Continuation of application No. PCT/CN2021/103190, filed on Jun. 29, 2021.

(30) Foreign Application Priority Data

Jul. 2, 2020  (CN) .................. 202010634533.0

(51) Int. Cl.
G06F 40/00       (2020.01)
G06F 3/0483      (2013.01)
G06F 40/18       (2020.01)

(52) U.S. Cl.
CPC ............ *G06F 3/0483* (2013.01); *G06F 40/18* (2020.01)

(58) Field of Classification Search
CPC .................. G06F 3/0483; G06F 40/18
See application file for complete search history.

(56) References Cited

U.S. PATENT DOCUMENTS

| | | | | |
|---|---|---|---|---|
| 5,787,416 A | * | 7/1998 | Tabb ............... | G06F 16/94 |
| | | | | 707/738 |
| 6,112,216 A | * | 8/2000 | Pratley ............ | G06F 40/177 |
| | | | | 715/227 |

(Continued)

FOREIGN PATENT DOCUMENTS

| | | | |
|---|---|---|---|
| CN | 102982089 A | * | 3/2013 |
| CN | 103914181 A |  | 7/2014 |

(Continued)

OTHER PUBLICATIONS

How to Navigate Directly from One Table to Another in Word 2013 by Lori Kaufman, Jul. 2, 2013, 4 pages (retrieved https://www.howtogeek.com/166345/how-to-navigate-directly-from-one-table-to-another-in-word-2013). (Year: 2013).*

(Continued)

*Primary Examiner* — Scott T Baderman
*Assistant Examiner* — Barbara M Level

(57) ABSTRACT

A method and an apparatus for browsing a table in a document, and an electronic device and a storage medium. The method includes: in a process of editing a table in an online document, receiving a table page jump instruction of a first table and jumping from a document page corresponding to the online document to a first table page for display; receiving a table switching instruction in the first table page; and switching from the first table page to a second table page for display according to the table switching instruction;

(Continued)

where the first table page is used to display the first table, and the second table page is used to display a second table. Tables can be switched quickly, and the browsing speed of tables can be improved.

19 Claims, 7 Drawing Sheets

(56) References Cited

U.S. PATENT DOCUMENTS

| | | | | |
|---|---|---|---|---|
| 8,832,543 | B2* | 9/2014 | Broman | G06F 40/166 715/255 |
| 9,053,158 | B1 | 6/2015 | Lee | |
| 2009/0217158 | A1* | 8/2009 | Bailey | G06F 16/972 715/255 |
| 2014/0032489 | A1 | 1/2014 | Hebbar et al. | |
| 2014/0317541 | A1* | 10/2014 | Li | G06F 3/0488 715/764 |

FOREIGN PATENT DOCUMENTS

| | | | |
|---|---|---|---|
| CN | 105224225 | A | 1/2016 |
| CN | 105630366 | A | 6/2016 |
| CN | 106095992 | A | 11/2016 |
| CN | 109408752 | A | 3/2019 |
| CN | 109445677 | A | 3/2019 |
| CN | 109657206 | A | 4/2019 |
| CN | 109658206 | A | 4/2019 |
| CN | 109992759 | A | 7/2019 |
| CN | 110008455 | A | 7/2019 |
| CN | 111797603 | A | 10/2020 |
| JP | 2007079858 | A | 3/2007 |
| JP | 2007233739 | A | 9/2007 |
| JP | 2019207527 | A | 12/2019 |
| KR | 20120049190 | A | 5/2012 |
| KR | 20190125376 | A | 11/2019 |

OTHER PUBLICATIONS

Erin Wright Writing, How to Insert Figure Captions and Table Titles in Microsoft Word, by Erin Wright, archived May 12, 2020, 17 pages, (retrieved at https://web.archinve.org/web/20200512020549/ https://erinwrightwriting.com/insert-figure-captions-in-microsoft-word). (Year: 2020).*

How to Navigate Directly from One Table to Another in Word 2013, Archive retrieved at Wayback Machine, https://web.archive.org/web20160902223613/https://www.howtogeek.com/166345/how-to-navigate--directly-from-one-table-to-another-in-word-2013, Sep. 2, 2016. (Year: 2016).*

International Patent Application No. PCT/CN2021/103190, International Search Report dated Sep. 28, 2021, 12 pages.

Chinese Patent Application No. 202010634533.0, First Office Action, 14 pages with English Translation.

Chinese Patent Application No. 202010634533.0, Notice of Allowance, 5 pages with English Translation.

Office Action dated Feb. 21, 2023 in Japanese Application No. 2022-552448, with English translation (6 pages).

Written Decision on Registration dated May 30, 2023 in Korean Application No. 10-2022-7029723, with English translation (5 pages).

* cited by examiner

METHOD AND APPARATUS FOR BROWSING TABLE IN DOCUMENT, AND ELECTRONIC DEVICE AND STORAGE MEDIUM

CROSS-REFERENCE TO RELATED APPLICATIONS

This application is a continuation of International Application No. PCT/CN2021/103190, filed on Jun. 29, 2021, which claims priority to Chinese patent application No. 202010634533.0 filed on Jul. 2, 2020 and entitled "METHOD AND APPARATUS FOR BROWSING TABLE IN DOCUMENT, AND ELECTRONIC DEVICE AND STORAGE MEDIUM", both of the above applications are hereby incorporated by reference in their entireties.

TECHNICAL FIELD

Embodiments of the present disclosure relate to the field of document editing, and in particular, to a method and an apparatus for browsing a table in a document, and an electronic device and a storage medium.

BACKGROUND

With the development of the Internet, online document has gradually become a document format daily used by users. Online document may not only upload local created documents to the Internet automatically, but also facilitate sharing them with other users for online editing and commenting.

Tables can be added to an existing online document, and the number of added tables may be multiple. When there are too many inserted tables, it is only possible to navigate to each table to browse by sliding the online document.

The above method reduces the efficiency of browsing tables. If a user needs to compare multiple tables, the user needs to repeat the sliding multiple times, and it is very easy to miss comparison information.

SUMMARY

Embodiments of the present disclosure provides a method and an apparatus for browsing a table in a document, and an electronic device and a storage medium, which can switch tables quickly and improve browsing speed of tables.

In a first aspect, an embodiment of the present disclosure provides a method for browsing a table in a document, including:

in a process of editing a table in an online document, receiving a table page jump instruction of a first table and jumping from a document page corresponding to the online document to a first table page for display;

receiving a table switching instruction in the first table page; and switching from the first table page to a second table page for display according to the table switching instruction;

where the first table page is used to display the first table, and the second table page is used to display a second table, and the first table and the second table are tables which have been inserted in the online document.

In a second aspect, an embodiment of the present disclosure provides an apparatus for browsing a table in a document, including:

a table page jumping module, configured to receive a table page jump instruction of a first table in a process of editing a table in an online document, and jump from a document page corresponding to the online document to a first table page for display;

a table switching triggering module, configured to receive the table switching instruction in the first table page.

a table page switching module, configured to switch from the first table page to a second table page for display according to the table switching instruction; where the first table page is used to display the first table, and the second table page is used to display a second table.

In a third aspect, an embodiment of the present application provides an electronic device, including a memory, a processor, and a computer program stored on the memory and executable on the processor, where when the processor executes the program, the method for browsing a table in a document according to any one of the embodiments of the present disclosure is implemented In a fourth aspect, an embodiment of the present application provides a computer-readable storage medium, where the computer-readable storage medium has a computer program stored thereon, and when the program is executed by a processor, the method for browsing a table in a document according to any one of the embodiments of the present disclosure is implemented In a fifth aspect, an embodiment of the present application provides a computer program product, including a computer program carried on a non-transitory computer readable medium, and the computer program includes program code for performing the method for browsing a table in a document according to any one of the embodiments of the present disclosure.

In a sixth aspect, an embodiment of the present application provides a computer program, and when a processing apparatus executes the computer program, the method for browsing a table in a document according to any one of the embodiments of the present disclosure is executed.

According to the embodiments of the present disclosure, in a process of editing a table in an online document, by jumping to a first table page to display a first table and switching to a second table page when a table switching instruction is received in the first table page to display a second table, the problem of low table browsing speed in the prior art caused by that tables in an online document need to be browsed by means of sliding is solved, and tables can be quickly switched and displayed in the online document, the display speed of tables can be improved, and thus the browsing speed of tables can be improved.

BRIEF DESCRIPTION OF DRAWINGS

FIG. 2 is a schematic diagram of a document page in an embodiment of the present disclosure;

FIG. 3 is a schematic diagram of a first editing operation area in a document page in an embodiment of the present disclosure;

FIG. 4 is a schematic diagram of a table page in an embodiment of the present disclosure;

DESCRIPTION OF EMBODIMENTS

Figure 1:
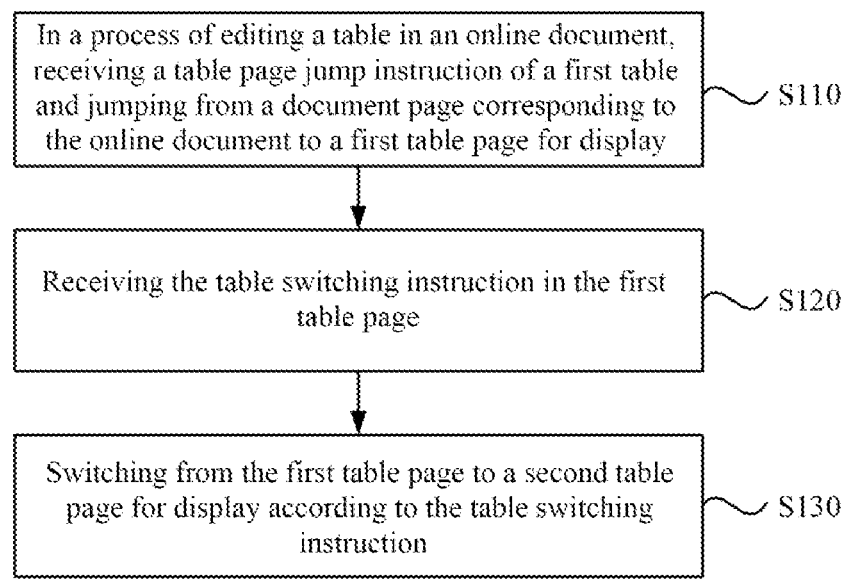
FIG. 1 is a flowchart of a method for browsing a table in a document in an embodiment of the present disclosure.

Embodiments of the present disclosure will be described in details below with reference to the accompanying drawings. While certain embodiments of the present disclosure are shown in the drawings, it should be understood that the present disclosure may be embodied in various forms and should not be construed as limited to the embodiments set forth herein, but rather these embodiments are provided for a thorough and complete understanding of the present disclosure. It should be understood that the drawings and embodiments of the present disclosure are only for illustrative purposes, and are not intended to limit the protection scope of the present disclosure.

It should be understood that the various steps described in the method embodiments of the present disclosure may be performed in different orders and/or in parallel. Furthermore, method embodiments may include an additional step and/or omit performing an illustrated step. The scope of the present disclosure is not limited in this regard.

As used herein, the term "including" and variations thereof are open-ended inclusions, i.e., "including but not limited to"; the term "based on" is "based at least in part on"; the term "an embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "one" and "more" mentioned in the present disclosure are illustrative rather than restrictive, and those skilled in the art should understand that unless the context clearly indicates otherwise, they should be understood as "one or more".

The names of messages or information exchanged between multiple devices in the embodiments of the present disclosure are only for illustrative purposes, and are not intended to limit the scope of these messages or information.

EMBODIMENTS

FIG. 1 is a flowchart of a method for browsing a table in a document in an embodiment of the present disclosure, which is applicable to browsing multiple tables in an online document quickly. The method may be executed by an apparatus for browsing a table in a document, and the apparatus may be implemented in software and/or hardware. The apparatus may be configured in an electronic device, and specifically, the electronic device may be a terminal device or a server, and the terminal device may include a mobile phone, a vehicle-mounted terminal, a notebook computer, or the like. As shown in FIG. 1, the method specifically includes the following steps.

S110, in a process of editing a table in an online document, receiving a table page jump instruction of a first table and jumping from a document page corresponding to the online document to a first table page for display.

The online document may be a document viewed and edited on a web page, where the online document may be saved in a network in real time, and may even be edited online by multiple people at the same time. In fact, the electronic device connects to the online document through the network, and sends a received editing operation instruction to the online document. In a subsequent operation process, the electronic device needs to be maintained in an online state to continuously send various received operation instructions to the online document, and return the editing result to the electronic device for display, so as to realize the effect of online editing.

In the embodiments of the present disclosure, the online document may also include other contents, e.g., data such as text, an image, a file, and a web page, which may be added and edited according to actual conditions. The embodiments of the present disclosure do not specifically limit this.

A table may be inserted and edited in the online document. The table is a spreadsheet capable of data processing, for example, a table in an excel format. The table includes multiple cells, and editing operations may be performed on a cell basis. Specifically, the table may perform calculation operations, search operations, table editing operations, and the like. For example, the calculation operations may include: mathematical operations and/or function operations, and the like. The table editing operations may refer to existing table editing operations, such as cell merging, cell splitting, cell insertion, cell deletion, cell background color adjustment, font color adjustment, and font style adjustment. There are other editing operations, which are not specifically limited in the embodiments of the present disclosure.

Data may be entered and displayed in cells. Optionally, the data inserted in the first table includes at least one of the followings: text, an image, audio and video.

The text may include characters and symbols, and the characters are, for example, numbers, letters and characters, and the like. Calculation operations may be performed on the text in a cell. The image, audio and video in a cell may all be obtained locally, that is, a local resource, or may be a resource on the network. Images and text may be drawn and displayed directly in the table. The audio data or video data in a cell is actually an address pointing to the audio or video.

In addition, the data of a cell may also include a hyperlink. The hyperlink is used to point to a target object, and is specifically used to jump to a page to which the target object belongs according to a pre-established connection relationship from a web page to which a table belongs to the target object. The target object may be a position on the web page, to which the table belongs, or other web page, email address, file, picture, audio, video, or even an application. In the embodiment, the text and image in a cell may be used as an object of a hyperlink, that is, clicking the text or image in the cell may indicate jumping to a pointed target page.

The range of editable objects in a table is increased by inserting multiple types of data into the table.

Figure 2:
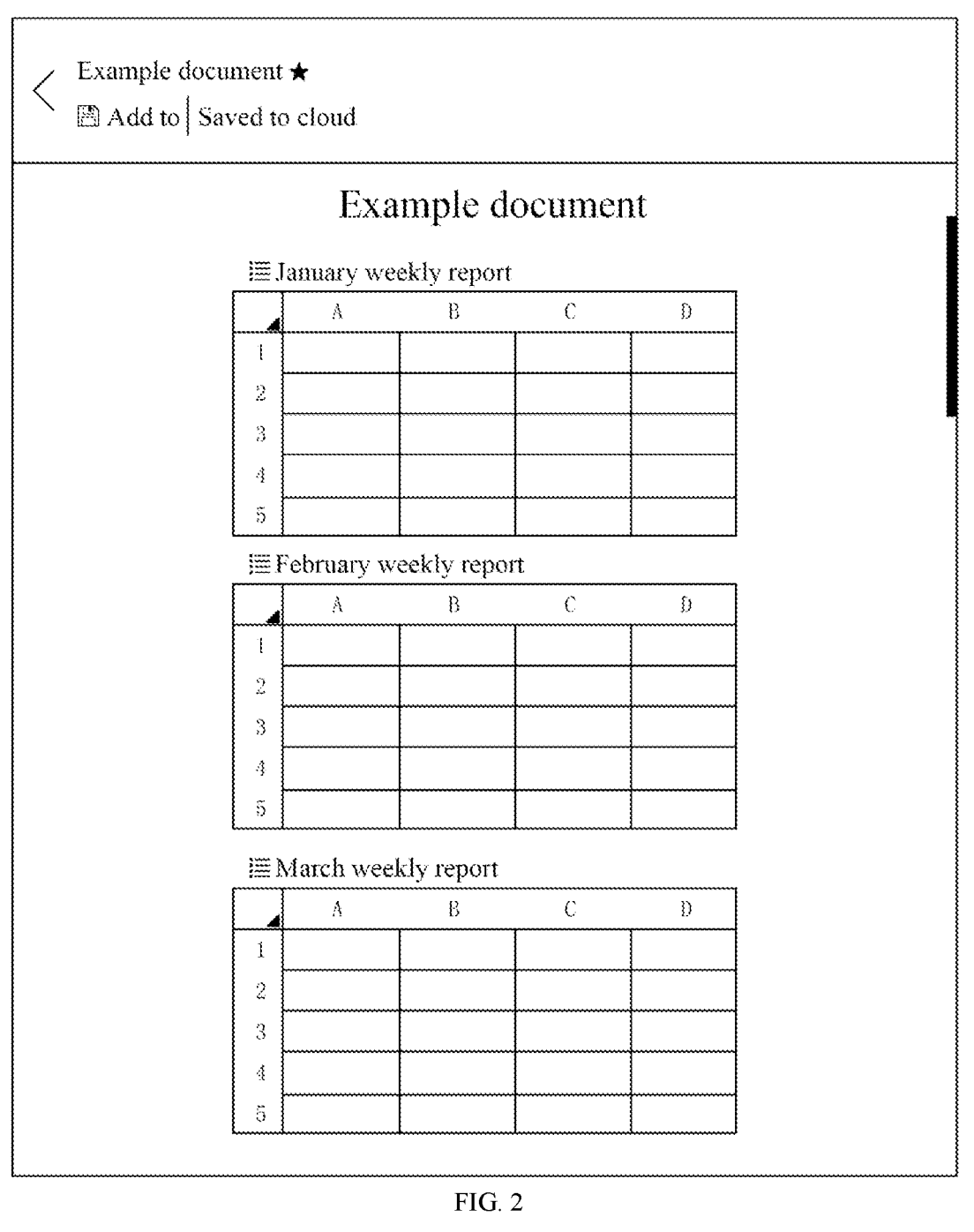

The first table is a table inserted in the online document. Multiple tables may be inserted in an online document. The document page of the online document may be regarded as a long page, and the tables are arranged from top to bottom according to inserted positions in the document page. Specifically, as shown in FIG. 2, the document page includes three tables. The order of the three tables from top to bottom is a first table (January weekly report), a second table (February weekly report) and a third table (March weekly report). When browsing the document page, only part of the content of the online document is displayed in a scroll area, and thus different contents in the document page may be displayed in the scroll area by scrolling up and down the document page to browse different tables in the document page. It can be understood that the more rows of a table, the greater the proportion of the page height occupied by the corresponding table in the document page, and the less the number of tables that may be displayed in the scrolling area, and thus, the sliding time and/or the number of times of sliding required for browsing the tables is increased. Therefore, with the sliding method in the prior art, a user needs to slide multiple times and spend a longer sliding time to browse all the tables, which reduces the browsing speed of the tables and the querying speed of the data in the tables.

The table page jump instruction is used to jump to a first table page to which the first table belongs. The first table page is used to display the first table. A table page is used to display a page independently, and only content related to a table is displayed, and content other than the table in the document page will not be displayed in the table page. The document page includes a control for receiving the table page jump instruction, and the user may input the table page jump instruction by triggering the control. The triggering method may be a click operation, a pressing operation, a gesture operation, etc., and an area for operation, the number of operations, and a time of operation may be set as required, which are not specifically limited in the embodiments of the present disclosure.

The web page side receives the table page jump instruction, generates and displays the first table page, thereby implementing the jumping from the document page corresponding to the online document to the first table page.

Optionally, the receiving the table page jump instruction of the first table, and jumping from the document page corresponding to the online document to the first table page for display includes: receiving, in the document page, a table editing trigger instruction of the first table, generating and displaying a first editing operation area at a position matching the table editing trigger instruction; receiving the table page jump instruction of the first table in the first editing operation area; and generating the first table page according to the table page jump instruction of the first table and displaying the first table page.

The document page includes a control for receiving a table editing trigger instruction for the first table, and the user may input the table editing trigger instruction of the first table by triggering the control. Illustratively, the control may refer to the first table, that is, it is determined that the user inputs the table editing trigger instruction of the first table when the user clicks the first table. The operation of clicking the first table may refer to input a click operation in the area of the first table displayed in the document page, and the operation object of the click operation may be any cell, a table header, a cursor of the first table or the like.

The table editing trigger instruction is used to generate the first editing operation area. In the document page, the table editing trigger instruction of the first table is received, indicating that an editing operation needs to be performed on the first table. The editing operation area includes a plurality of editing controls, which are used to receive user's editing operation instructions to edit the table, so as to realize providing for the user the editing functions of the table. The editing controls in the first editing operation area are used to perform the editing operations on the first table.

The table page jump instruction is received in the first editing operation area, indicating that it is necessary to jump to the first table page to which the first table belongs currently. The table page jump instruction of the first table is used to point to the first table page. When it is determined that it is necessary to jump to the first table page, data of the first table is acquired, and the first table page is generated. The first table page is used to display the first table, and the content of other tables will not be displayed on the first table page, but it is possible to jump from the first table page to other table pages to implement display and edition of other tables.

Figure 3:
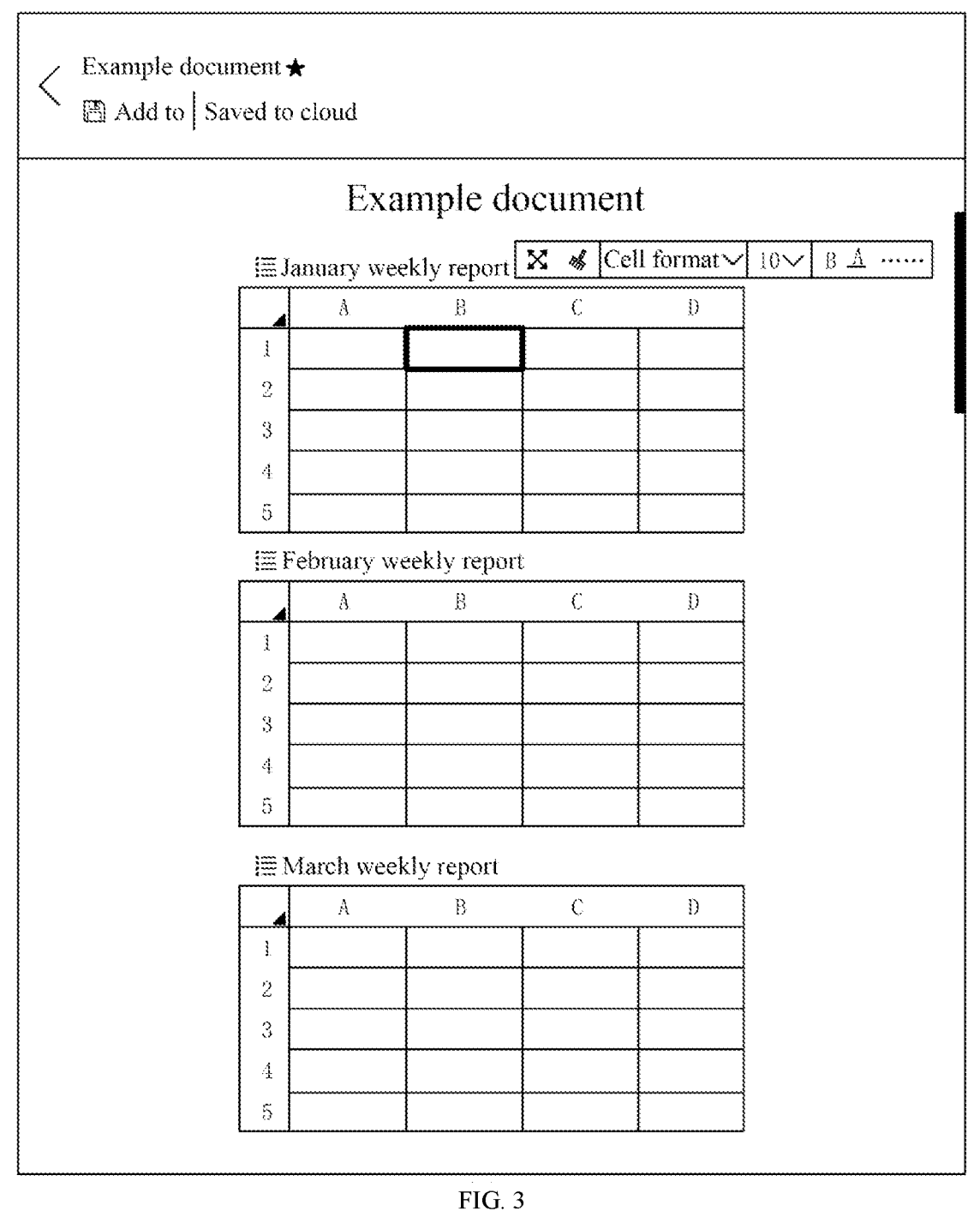

Illustratively, the editing operation area may refer to a toolbar, the editing control may refer to an editing tool in the toolbar, and the table page jump instruction may refer to a "full screen" control in the toolbar. Specifically, as shown in FIG. 3, when cell B1 of the January weekly report table is selected, a first editing operation area may be generated above the January weekly report table. The first editing operation area includes multiple editing tools, such as format painter, cell format setting, font size setting, bold setting, underline setting, etc.

The editing function of the first table is provided to the user by receiving the table editing trigger instruction of the first table in the document page and generating the first editing operation area. The table page jump instruction of the first table is received in the first editing operation area, then the first table page is generated, it is possible to enter the independent display page of the table and perform table page switching from the first table page to other table pages quickly, thereby realizing browsing of tables in a switching manner, reducing the operation time of browsing multiple tables, and improving the speed of table browsing.

Optionally, after the jumping from the document page corresponding to the online document to the first table page for display, and before switching from the first table page to a second table page for display according to the table switching instruction, the method for browsing a table in a document further includes: receiving a document page jump instruction in a second editing operation area of the first table page, and jumping from the first table page to the document page for display.

Editing controls in the second editing operation area are used to edit the first table and are located on the table page. These editing controls are partially the same as or completely different from those in the first editing operation area. The second editing operation area includes a jump control for jumping to the document page, and a document page jump instruction is received in the second editing operation area, indicating that it is necessary to jump to the document page currently. The document page jump instruction is used to point to the document page. When it is determined that it is needed to jump to the document page, the current table page (for example, the first table page) may be turned off and the document page may be returned to for display, or a document page is re-generated for display.

Figure 4:
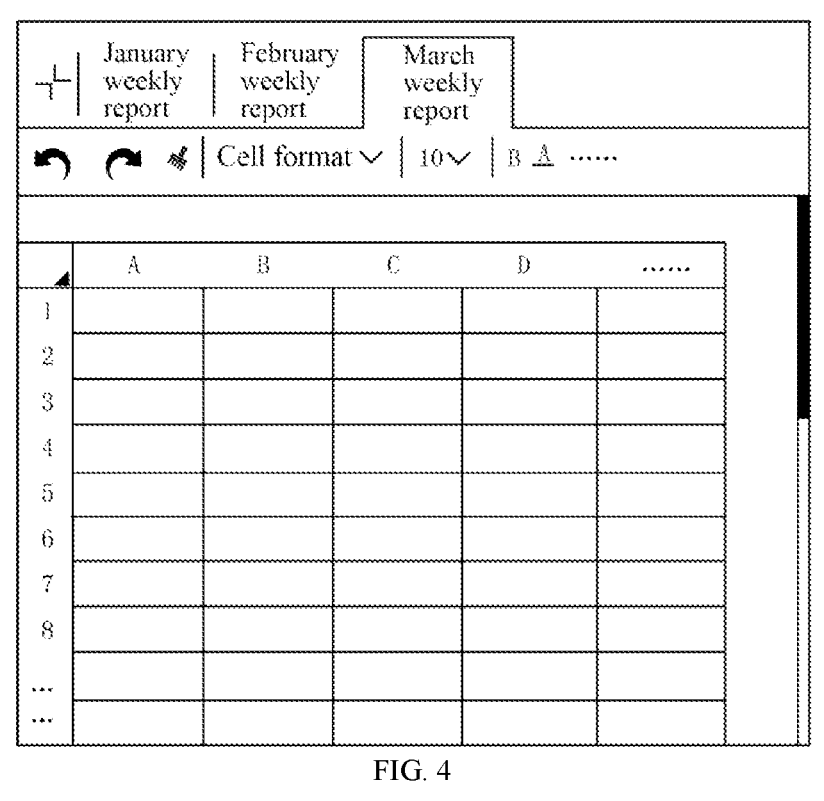

Illustratively, the document page jump instruction may refer to an "exit full screen" control in a toolbar. The second editing operation area in the table page may refer to a toolbar, and the second editing operation area includes a plurality of editing controls which may refer to editing tools in the toolbar. The document page jump instruction may refer to the "exit full screen" control in the toolbar. Specifically, as shown in FIG. 4, the "exit full screen" control is on the left side of the area where the "January Weekly Report" is located. The first editing operation area and the second editing operation area include a plurality of identical editing controls, such as format painter, cell format setting, font size setting, bold setting, underline setting, etc. The second editing operation area may also include a plurality of editing controls that do not exist in the first editing operation area, such as undo or repeat.

It should be noted that, for each table in the document page, when the table editing trigger instruction is received, the first editing operation area for editing the current table may be generated and displayed. Correspondingly, the table page jump instruction is received in a first editing operation area of the current table, and a table page to which the current table belongs is jumped to. Each table page includes a second editing operation area, and the document page jump instruction may be received in the second editing operation area to jump from the current table page to the document page.

By configuring the second editing operation area in the table page, the editing functions of the first table is realized, and meanwhile, jumping from the first table page to the document page is realized, and mutual jump between the table page and the document page is accurately realized.

The table editing trigger instruction of the first table is received in the document page, and the first editing operation area is generated to provide editing functions of the first table to the user. The table page jump instruction of the first table is received in the first editing operation area, then the first table page is generated, and it is possible to enter the independent display page of the table and perform table page switching from the first table page to other table pages quickly, thereby realizing the browsing of tables in a switching manner, reducing the operation time of browsing multiple tables, and improving the speed of table browsing.

S120, receiving the table switching instruction in the first table page.

The table switching instruction is used to instruct the web page side to perform table page switching. Usually, a table page is used to display only one table, and different table pages display different tables. Each table page includes a control for receiving the table switching instruction, and the user may input the table switching instruction by triggering the control.

S130, switching from the first table page to a second table page for display according to the table switching instruction; where the first table page is used to display the first table, and the second table page is used to display a second table.

The web page side receives the table switching instruction, generates and displays the second table page. The first table and the second table may be completely the same, may be partially different, or may be completely different, which is not specifically limited by the embodiment of the present disclosure.

Optionally, before receiving the table page jump instruction of the first table, the method further includes: receiving a table inserting instruction in the document page; generating a table at a position matching the table inserting instruction in the document page according to the table inserting instruction.

The table inserting instruction is used to add a table in the document page. The inserted position of the table is determined according to the table inserting instruction. Illustratively, the row in which the inserted position of the table is located is the same as the row in which the input position of the table inserting instruction is located. The number of rows and columns of the added tables are specified by the table inserting instruction input by the user. Quick table addition in the document page is realized with the inserting instruction.

Optionally, the generating the first table page according to the table page jump instruction of the first table includes: acquiring a position sequence of each table of the document page in the document page respectively; generating a corresponding table identification area for each table, and determining an arrangement sequence of the table identification area corresponding to each table according to the position sequence, where data in the table identification area is used to identify a corresponding table; arranging each table identification area according to the arrangement sequence to form the table switching area, where the table switching instruction is an instruction input for the table identification area, and is used to switch to a table page to which the table corresponding to the table identification area belongs; and generating the first table page according to the first table and the table switching area.

The position sequence is used to describe a position of a table of the document page in the document page. Different tables have different upper and lower positions in the document page. Specifically, as shown in FIG. 2, the document page includes three tables, and the sequence of the three tables from top to bottom is a first table (January weekly report), a second table (February weekly report) and a third table (March weekly report).

The table identification area is used to identify a corresponding table, and specifically, the table is identified by the data in the table identification area. For example, the data in the table identification area includes a title name of the table. A table identification area is used to identify only one table, and a table identification area may be generated for each table correspondingly. Illustratively, the table identification area includes a first table identification area, a second table identification area, and a third table identification area, where data in the first table identification area is the first table, and data in the second table identification area is the second table, and data in the third table identification area is the third table.

In addition, the table identification area is also used to receive the table switching instruction. The table identification area may be used as a control for receiving the table switching instruction. When it is detected that the user inputs a click operation (such as a single-click operation) at any position in the table identification area, it is determined that the table identification area receives the table switching instruction. If the table currently displayed on the table page is different from the table identified by the table identification area, the table page corresponding to the table identified by the table identification area is switched to. If the table currently displayed on the table page is the same as the table identified by the table identification area, there is no need to switch.

Specifically, a correspondence relationship between the position sequence of each table in the document page and the arrangement sequence of the table identification area may be preconfigured, and the position of each table identification area may be determined according to the correspondence relationship between the position sequence and the arrangement sequence. For example, the table identification areas generated corresponding to respective tables is arranged according to the up-and-down arrangement sequence of each table in the document page. Illustratively, the corresponding relationship is specifically that the table identification areas are arranged up and down, and the up-and-down sequence of each table identification area is the same as or opposite to the up-and-down sequence of the identified tables in the document page. Alternatively, the table identification areas may also be arranged in a left-to-right sequence, and the left-to-right arrangement sequence of the table identification areas is the same as or opposite to the up-and-down arrangement sequence of the identified tables in the document page. In an example, as shown in FIG. 4, the arrangement sequence of the table identification area displaying "January weekly report", the table identification area displaying "February weekly report", and the table identification area displaying "March weekly report" are in a left-to-right arrangement sequence, and the left-to-right arrangement sequence is the same as the up-and-down arrangement sequence of the "January weekly report" table, the "February weekly report" table and the "March weekly report" table in the document page in FIG. 2.

Each table identification area is arranged in the arrangement sequence to form a new area used as the table switching area. The table switching area is used to receive the table switching instruction. Specifically, the table to be switched to is determined according to the input position of the table switching instruction, thereby generating a table page corresponding to the table to be switched to, and realizing the switching from the current table page to another table page.

The table switching area is located in the table page, and can realize the switching from one table page to another table page. Thus, the table page is used to display a table and the table switching area, and quick browsing of the table and quick switching to a table page of another table can be realized. The position of the table and the position of the table switching area in the table page may be set as required, which is not specifically limited in the embodiment of the present disclosure. Correspondingly, when the table page is generated, it is necessary to acquire the data of the table displayed on the table page, and generate the table switching area according to the identification data of all the tables included in the document page, so that the first table page can be generated according to the first table and the table switching area, whereby the first table can be displayed and edited in the first table page, as well as switched to another table page to browse another table. Actually, the table switching areas of different table pages that can be switched from the same document page are the same.

The tables are aggregated through the table switching area, and quick table switching can be realized when a switching instruction is received, which can provide a table switching function for the table pages and improve the browsing efficiency of the tables.

In the embodiment of the present disclosure, by jumping to a first table page to display a first table in a process of editing a table in an online document, and switching to a second table page when a table switching instruction is received in the first table page to display a second table, the problem of low table browsing speed in the prior art caused by that tables in an online document need to be browsed by means of sliding is solved, and tables can be quickly switched and displayed in the online document with two steps, the display speed of tables can be improved, and thus the browsing speed of tables can be improved.

Figure 5:
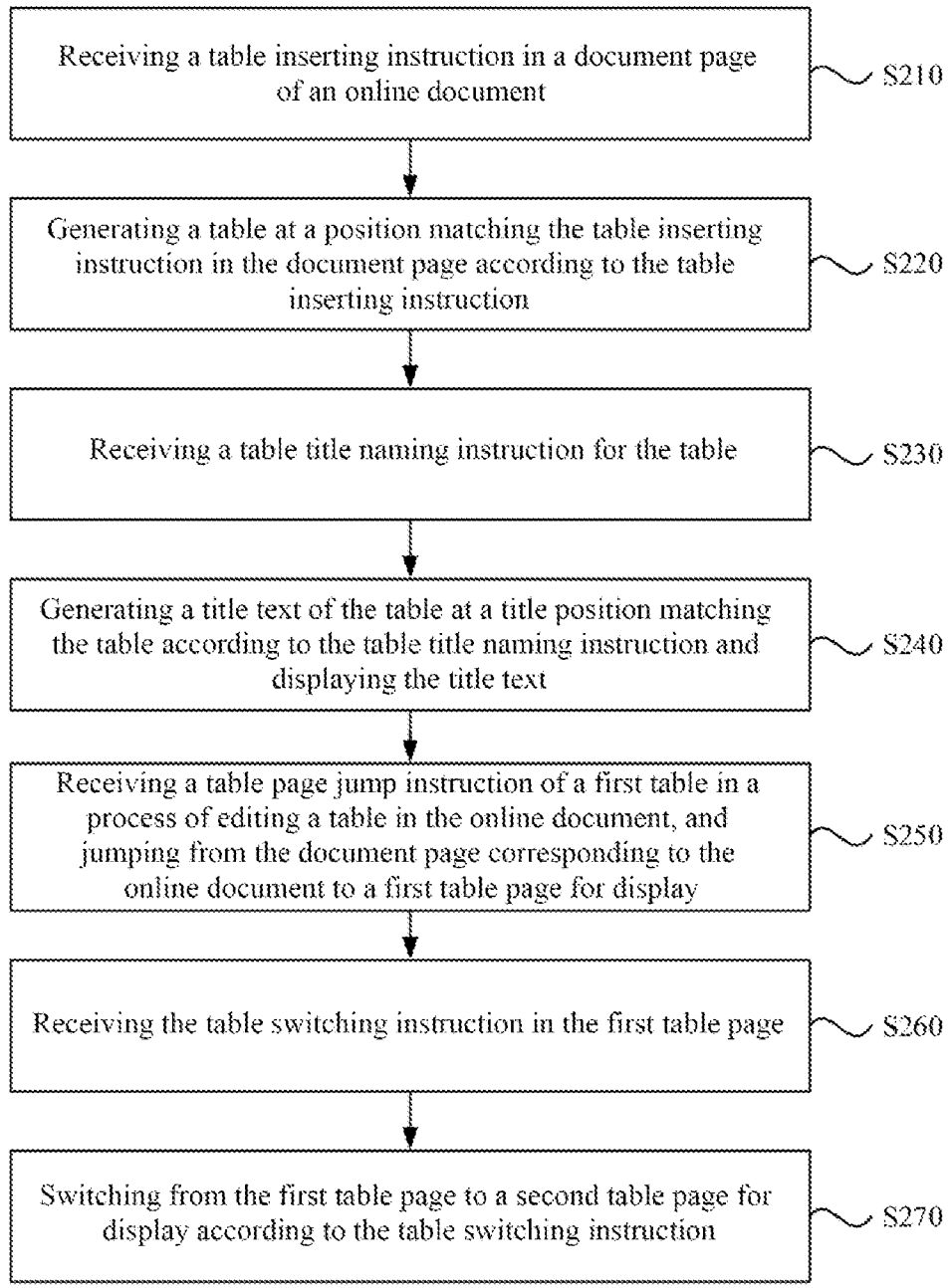
FIG. 5 is a flowchart of a method for browsing a table in a document in an embodiment of the present disclosure.

In an illustrative implementation, FIG. 5 is a flowchart of a method for browsing a table in a document in an embodiment of the present disclosure, and the method specifically includes the following steps.

S210, receiving a table inserting instruction in a document page of an online document.

For the description not detailed in the embodiment of the present disclosure, reference may be made to the foregoing.

S220, generating a table at a position matching the table inserting instruction in the document page according to the table inserting instruction.

Actually, the table inserting instruction is used to determine a type of the table, the number of rows, the number of columns and the inserting position of the table added in the document page.

S230, receiving a table title naming instruction for the table.

The table title naming instruction is used to add a title for the table.

It should be noted that, if the table title naming instruction input by a user is not received, the title for the table is named according to a preset rule, for example, using a combination of letters and numbers for naming.

S240, generating a title text of the table at a title position matching the table according to the table title naming instruction and displaying the title text.

The title text is used as the title of the table. A table title area to which the title position belongs is used to display the title text of the table, and the title position may refer to the position of the table title area in the document page.

Figures 6, 7:
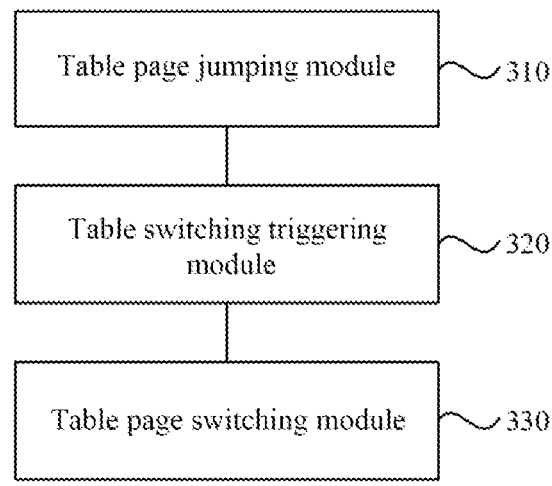
FIG. 6 is a schematic diagram of a table title area in a document page in an embodiment of the present disclosure.
FIG. 7 is a schematic structural diagram of an apparatus for browsing a table in a document in an embodiment of the present disclosure.

Illustratively, a click operation (such as a double-click operation) input by a user in the table title area may be detected as receiving the table title naming instruction. The title position of the table title area may be located above the position of the table, for example, the row where the title position is located is adjacent to the row where the table header is located, and is an upper row of the row where the table header is located. Specifically, as shown in FIG. 6, the block to which the "Table title" belongs is the table title area, and the user may input the table title by double-clicking the table title area.

S250, receiving a table page jump instruction of a first table in a process of editing a table in the online document, and jumping from the document page corresponding to the online document to a first table page for display.

S260, receiving the table switching instruction in the first table page.

S270, switching from the first table page to a second table page for display according to the table switching instruction; where the first table page is used to display the first table, and the second table page is used to display a second table.

In the embodiment of the present disclosure, the title position of the table is configured in the document page where the table is added, and the table title is generated and displayed according to the table title naming instruction, thereby realizing the display of description content of the table, and avoiding the situation that the content of the table can only be determined through adding a description text of the table. It is convenient for users to quickly understand the content of the table, and meanwhile it is convenient for users to quickly switch to the table page corresponding to the table according to the table title, which improves the positioning efficiency of the table, thereby improving the browsing speed of the table.

FIG. 7 is a schematic structural diagram of an apparatus for browsing a table in a document in an embodiment of the present disclosure. The apparatus may be implemented by means of software and/or hardware, and the apparatus may be configured in an electronic device. The apparatus may include a table page jumping module 310, a table switching triggering module 320 and a table page switching module 330.

The table page jumping module 310 is configured to receive a table page jump instruction of a first table in a process of editing a table in an online document, and jump from a document page corresponding to the online document to a first table page for display.

The table switching triggering module 320 is configured to receive the table switching instruction in the first table page.

The table page switching module 330 is configured to switch from the first table page to a second table page for display according to the table switching instruction; where the first table page is used to display the first table, and the second table page is used to display a second table.

According to the embodiment of the present disclosure, in a process of editing a table in an online document, by jumping to a first table page to display a first table and switching to a second table page when a table switching instruction is received in the first table page to display a second table, the problem of low table browsing speed in the prior art caused by that tables in an online document need to be browsed by means of sliding is solved, and tables can be quickly switched and displayed in the online document, the display speed of tables can be improved, and thus the browsing speed of tables can be improved.

Further, the table page jumping module 310 includes an editing operation area displaying unit, configured to receive, in the document page, a table editing trigger instruction of the first table, generate and display a first editing operation area at a position matching the table editing trigger instruction; receive the table page jump instruction of the first table in the first editing operation area; and generate the first table page according to the table page jump instruction of the first table and display the first table page.

Further, the apparatus for browsing a table in a document further includes a table inserting module, configured to receive a table inserting instruction in the document page before the table page jump instruction of the first table is received; and generate, according to the table inserting instruction, a table at a position in the document page that matches the table inserting instruction.

Further, the apparatus for browsing a table in a document further includes a table title naming module, configured to receive a table title naming instruction for the table after the table is generated at the position in the document page that matches the table inserting instruction; and generate a title text of the table at a title position matching the table according to the table title naming instruction and display the title text.

Further, the editing operation area displaying unit includes a table switching area generating subunit, configured to acquire a position sequence of each table of the document page in the document page respectively; generate a corresponding table identification area for each table, and determine an arrangement sequence of the table identification area corresponding to each table according to the position sequence, where data in the table identification area is used to identify the corresponding table; arrange each table identification area according to the arrangement sequence to form the table switching area; where the table switching instruction is an instruction input for the table identification area, and is used to switch to a table page to which the table corresponding to the table identification area belongs; and generate the first table page according to the first table and the table switching area.

Further, the apparatus for browsing a table in a document further includes a document page jumping module, configured to, after the document page corresponding to the online document is jumped to the first table page for display and before the first table page is switched to the second table page for display according to the table switching instruction, receive a document page jump instruction in a second editing operation area of the first table page and jump from the first table page to the document page for display.

Further, data inserted in the first table includes at least one of the following: text, an image, audio and video.

The apparatus for browsing a table in a document provided by the embodiment of the present disclosure belongs to the same inventive concept as the method for browsing a table in a document. The technical details that are not described in detail in the embodiment of the present disclosure may refer to the foregoing, and the present embodiment of the disclosure and the foregoing embodiment have the same beneficial effect.

Figure 8:
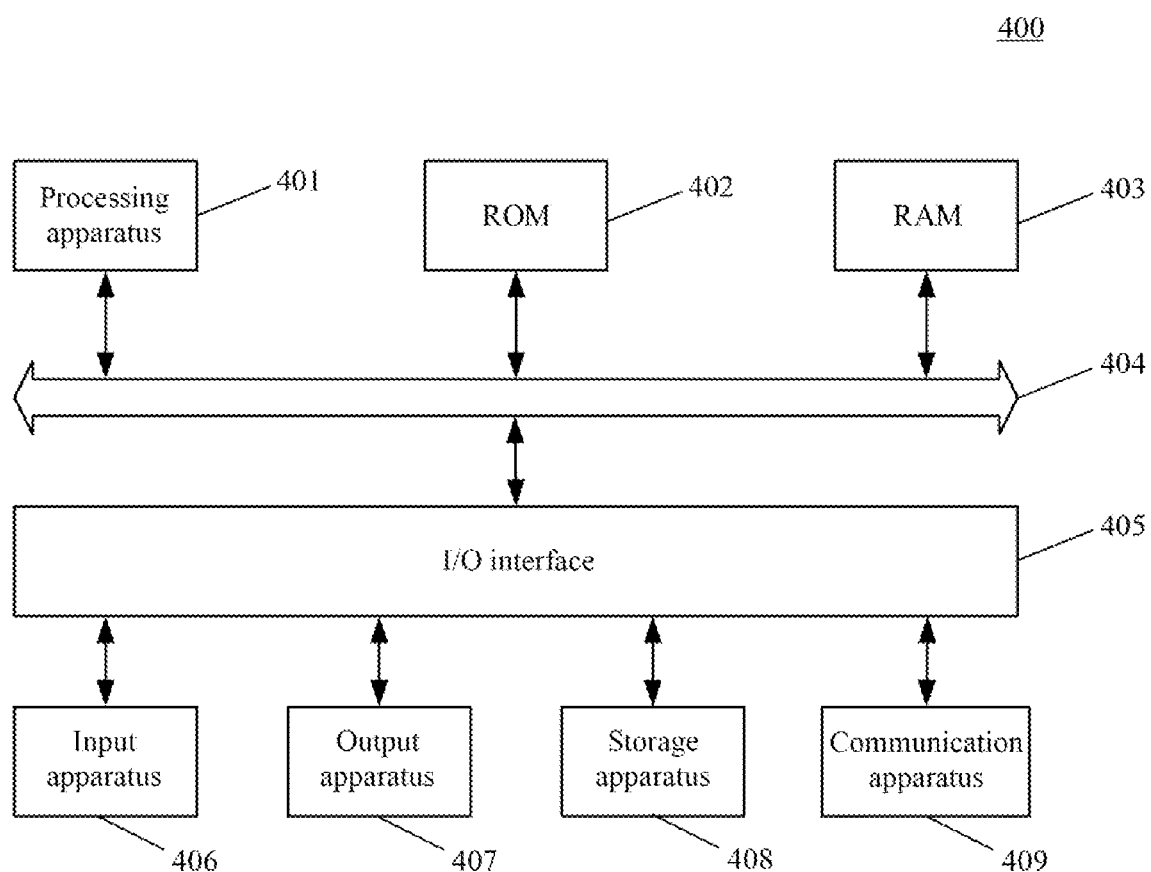
FIG. 8 is a schematic structural diagram of an electronic device in an embodiment of the present disclosure.

Referring to FIG. 8, it shows a schematic structural diagram of an electronic device (e.g., a terminal device or a server in FIG. 1) 400 suitable for implementing the embodiments of the present disclosure. The terminal device in the embodiment of the present disclosure may include, but is not limited to, a mobile terminal such as a mobile phone, a notebook computer, a digital broadcast receiver, a PDA (Personal Digital Assistant), a PAD (Portable android device, tablet computer), a PMP (Portable Media Player, portable multimedia player), an in-vehicle terminal (e.g., an in-vehicle navigation terminal), etc., and a stationary terminal such as a digital TV, a desktop computer, and the like. The electronic device shown in FIG. 8 is only an example, and should not impose any limitation on the function and the scope of use of the embodiments of the present disclosure.

As shown in FIG. 8, the electronic device 400 may include a processing apparatus (e.g., a central processing unit, a graphics processor, etc.) 401, which may execute various appropriate actions and processing based on a program stored in a read-only memory (ROM) 402 or a program loaded from a storage apparatus 408 into a random access memory (RAM) 403. In the RAM 403, various programs and data necessary for the operation of the electronic device 400 are also stored. The processing apparatus 401, the ROM 402, and the RAM 403 are connected to each other through a bus 404. An input/output (I/O) interface 405 is also connected to the bus 404.

Typically, the following apparatuses may be connected to the I/O interface 405: an input apparatus 406 including, for example, a touch screen, a touchpad, a keyboard, a mouse, a camera, a microphone, an accelerometer, a gyroscope, etc.; an output apparatus 407 including, for example, a liquid crystal display (LCD), a speaker, a vibrator, etc.; a storage apparatus 408 including, for example, a magnetic tape, a hard disk, etc.; and a communication apparatus 409. The communication apparatus 409 may allow electronic device 400 to communicate wirelessly or wired with other devices to exchange data. Although FIG. 8 shows an electronic device 400 having various apparatuses, it should be understood that not all of the illustrated apparatuses are required to be implemented or provided. More or fewer apparatuses may alternatively be implemented or provided.

In particular, the processes described above with reference to the flowcharts may be implemented as a computer software program according to embodiments of the present disclosure. For example, an embodiment of the present disclosure includes a computer program product comprising a computer program carried on a non-transitory computer readable medium; the computer program includes program code for performing a method illustrated in a flowchart. In such an embodiment, the computer program may be downloaded and installed from the network via the communication apparatus 409, or installed from the storage apparatus 408, or installed from the ROM 402. When the computer program is executed by the processing apparatus 401, the above-mentioned functions defined in the methods of the embodiments of the present disclosure are executed. An embodiment of the present disclosure also includes a computer program that, and when the computer program is executed on an electronic device, the above-mentioned functions defined in a method of an embodiment of the present disclosure is performed.

It should be noted that the computer-readable medium mentioned above in the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connection with one or more wires, a portable computer disk, a hard disk, a random access memory (RAM), a read only memory (ROM), an erasable programmable read only memory (Erasable Programmable ROM, EPROM or flash memory), optical fiber, a portable compact disk read only memory (Compact Disk ROM, CD-ROM), an optical storage device, a magnetic storage device, or any suitable combination of the above. In the present disclosure, a computer-readable storage medium may be any tangible medium that contains or stores a program that can be used by or in conjunction with an instruction execution system, apparatus, or device. In the present disclosure, a computer-readable signal medium may include a data signal propagated in baseband or as part of a carrier wave with computer-readable program code carried therein. Such a propagated data signal may take a variety of forms, including but not limited to an electromagnetic signal, an optical signal, or any suitable combination of the foregoing. A computer-readable signal medium may also be any computer-readable medium other than a computer-readable storage medium, and the computer-readable signal medium may transmit, propagate, or transport the program for use by or in connection with the instruction execution system, apparatus, or device. The program code contained on the computer-readable medium may be transmitted by any suitable medium, including but not limited to: an electric wire, an optical cable, RF (Radio Frequency, radio frequency), etc., or any suitable combination of the above.

In some embodiments, a client and a server may use any currently known or future developed network protocol such as HTTP (HyperText Transfer Protocol) to communicate, and may interconnect with digital data communications (e.g., a communication network) in any form or medium. Examples of the communication network include a local area network (LAN), a wide area network, (WAN), an internet (e.g., the Internet), and an end-to-end network (e.g., ad hoc end-to-end network) and any currently known or future developed networks.

The computer-readable medium may be included in the electronic device, or may exist alone without being assembled into the electronic device.

The computer-readable medium carries one or more programs, and when the one or more programs are executed by the electronic device, the electronic device is caused to: in a process of editing a table in an online document, receive a table page jump instruction of a first table and jump from a document page corresponding to the online document to a first table page for display; receive the table switching instruction in the first table page; switch from the first table page to a second table page for display according to the table switching instruction; where the first table page is used to display the first table, and the second table page is used to display a second table.

Computer program code for performing operations of the present disclosure may be written in one or more programming languages, including but not limited to object-oriented programming languages—such as Java, Smalltalk, C++, and conventional procedural programming languages—such as the "C" language or similar programming languages. The program code may be executed entirely on a user computer, partly on a user computer, as a stand-alone software package, partly on a user computer and partly on a remote computer, or entirely on a remote computer or server. In a case involving a remote computer, the remote computer may be connected to the user computer through any kind of network, including a local area network (LAN) or a wide area network (WAN), or may be connected to an external computer (e.g., using an Internet service provider via Internet connection).

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, a program segment, or portion of code, which contains one or more executable instructions for implementing a specified logical function. It should also be noted that, in some alternative implementations, the functions noted in the blocks may occur in an order different from that noted in the figures. For example, two blocks shown in succession may, in fact, be executed substantially concurrently, or the blocks may sometimes be executed in the reverse order, depending upon the functionality involved. It is also noted that each block of the block diagrams and/or flowcharts, and combinations of blocks in the block diagrams and/or flowcharts, may be implemented by a dedicated hardware-based system that performs the specified functions or operations, or may be implemented with a combination of dedicated hardware and a computer instruction.

The modules involved in the embodiments of the present disclosure may be implemented in software or hardware. Where the names of the modules do not constitute a limitation of the modules themselves in some cases, for example, the table page jumping module may also be described as "a module which receives a table page jump instruction of a first table in a process of editing a table in an online document, and jumps from a document page corresponding to the online document to a first table page for display".

The functions described herein above may be performed, at least in part, by one or more hardware logic components. For example, without limitation, exemplary types of hardware logic components which may be used include: a field programmable gate array (FPGA), an application specific integrated circuit (ASIC), an application specific standard product (ASSP), a system on chip (SOC), a complex programmable logic device (CPLD) and so on.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but are not limited to, an electronic, magnetic, optical, electromagnetic, infrared, or semiconductor system, apparatus or device, or any suitable combination of the foregoing. More specific examples of the machine-readable storage medium may include an electrical connection based on one or more wires, a portable computer disk, a hard disk, a random access memory (RAM), a read only memory (ROM), an erasable programmable read only memory (EPROM or flash memory), optical fiber, a compact disk read only memory (CD-ROM), an optical storage device, a magnetic storage device, or any suitable combination of the foregoing.

According to one or more embodiments of the present disclosure, the present disclosure provides a method for browsing a table in a document, including:

in a process of editing a table in an online document, receiving a table page jump instruction of a first table and jumping from a document page corresponding to the online document to a first table page for display;

receiving the table switching instruction in the first table page;

switching from the first table page to a second table page for display according to the table switching instruction;

where the first table page is used to display the first table, and the second table page is used to display a second table.

According to one or more embodiments of the present disclosure, in the method for browsing a table in a document provided by the present disclosure, the receiving the table page jump instruction of the first table and jumping from the document page corresponding to the online document to the first table page for display includes: receiving a table editing trigger instruction of the first table in the document page, generating a first editing operation area at a position matching the table editing trigger instruction and displaying the first editing operation area; receiving a table page jump instruction of the first table in the first editing operation area; generating the first table page according to the table page jumping instruction of the first table, and displaying the first table page.

According to one or more embodiments of the present disclosure, in the method for browsing a table in a document provided by the present disclosure, before receiving the table page jump instruction of the first table, the method further includes receiving a table inserting instruction in the document page; generating a table at a position matching the table inserting instruction in the document page according to the table inserting instruction.

According to one or more embodiments of the present disclosure, in the method for browsing a table in a document provided by the present disclosure, after generating the table at the position matching the table inserting instruction in the document page, the method further includes receiving a table title naming instruction for the table; and generating a title text of the table at a title position matching the table according to the table title naming instruction and displaying the title text of the table.

According to one or more embodiments of the present disclosure, in the method for browsing a table in a document provided by the present disclosure, the generating the first table page according to the table page jump instruction of the first table includes: acquiring a position sequence of each table of the document page in the document page respectively; generating a corresponding table identification area for each table, and determining an arrangement sequence of the table identification area corresponding to each table according to the position sequence, where data in the table identification area is used to identify the corresponding table; arranging each table identification area according to the arrangement sequence to form the table switching area; where the table switching instruction is an instruction input for the table identification area, and is used to switch to a table page to which the table corresponding to the table identification area belongs; and generating the first table page according to the first table and the table switching area.

According to one or more embodiments of the present disclosure, in the method for browsing a table in a document provided by the present disclosure, after the jumping from the document page corresponding to the online document to the first table page for display, and before switching from the first table page to the second table page for display according to the table switching instruction, the method further includes: receiving a document page jump instruction in a second editing operation area of the first table page, and jumping from the first table page to the document page for display.

According to one or more embodiments of the present disclosure, in the method for browsing a table in a document provided by the present disclosure, data inserted in the first table includes at least one of the following: text, an image, audio and video.

According to one or more embodiments of the present disclosure, the present disclosure provides an apparatus for browsing a table in a document, including:

a table page jumping module, configured to receive a table page jump instruction of a first table in a process of editing a table in an online document, and jump from a document page corresponding to the online document to a first table page for display;

a table switching triggering module, configured to receive the table switching instruction in the first table page;

a table page switching module, configured to switch from the first table page to a second table page for display according to the table switching instruction; where the first table page is used to display the first table, and the second table page is used to display a second table.

According to one or more embodiments of the present disclosure, in the apparatus for browsing a table in a document provided by the present disclosure, the table page jumping module includes: an editing operation area displaying unit, configured to: receive, in the document page, a table editing trigger instruction of the first table, generate a first editing operation area at a position matching the table editing trigger instruction and display the first editing operation area; receive a table page jump instruction of the first table in the first editing operation area; and generate the first table page according to the table page jump instruction of the first table, and display the first table page.

According to one or more embodiments of the present disclosure, the apparatus for browsing a table in a document provided by the present disclosure further includes: a table inserting module, configured to receive a table inserting instruction in the document page before the table page jump instruction of the first table is received; generate a table at a position matching the table inserting instruction in the document page according to the table inserting instruction.

According to one or more embodiments of the present disclosure, the apparatus for browsing a table in a document provided by the present disclosure further includes: a table title naming module, configured to receive a table title naming instruction for the table after the table is generated at the position matching the table inserting instruction in the document page; generate a title text of the table at a title position matching the table according to the table title naming instruction and display the title text.

According to one or more embodiments of the present disclosure, in the apparatus for browsing a table in a document provided by the present disclosure, the editing operation area displaying unit includes: a table switching area generating subunit, configured to acquire a position sequence of each table of the document page in the document page respectively; generate a corresponding table identification area for each table, and determine an arrangement sequence of the table identification area corresponding to each table according to the position sequence, where data in the table identification area is used to identify the corresponding table; arrange each table identification area according to the arrangement sequence to form the table switching area; where the table switching instruction is an instruction input for the table identification area, and is used to switch to a table page to which the table corresponding to the table identification area belongs; and generate the first table page according to the first table and the table switching area.

According to one or more embodiments of the present disclosure, the apparatus for browsing a table in a document provided by the present disclosure further includes: a document page jumping module, configured to, after the document page corresponding to the online document is jumped to the first table page for display and before the first table page is switched to the second table page for display according to the table switching instruction, receive a document page jump instruction in a second editing operation area of the first table page and jump from the first table page to the document page for display.

According to one or more embodiments of the present disclosure, in the apparatus for browsing a table in a document provided by the present disclosure, data inserted in the first table includes at least one of the following: text, an image, audio and video.

According to one or more embodiments of the present disclosure, the present disclosure provides an electronic device, including: a memory, a processor, and a computer program stored on the memory and executable on the processor, where when the processor executes the program, the method for browsing a table in a document according to any one of the embodiments of the present disclosure is implemented.

According to one or more embodiments of the present disclosure, the present disclosure provides a computer readable storage medium having a computer program stored thereon, and when the program is executed by a processor, the method for browsing a table in a document according to any one of the embodiments of the present disclosure is implemented.

The above description is merely an illustration of the preferred embodiments of the present disclosure and the applied technical principles. It should be understood by those skilled in the art that the scope of disclosure involved in the present disclosure is not limited to the technical solutions formed by the specific combination of the above technical features, and should also cover other technical solutions formed by any combination of the above technical features or equivalent features thereof without departing from the disclosed concept, for example, technical solutions formed by interchanging the above-mentioned features with, but not limited to, technical features having similar functions disclosed in the present disclosure.

In addition, while operations are depicted in a particular order, this should not be understood as requiring that such operations be performed in the particular order shown or in sequential order. In certain circumstances, multitasking and parallel processing may be advantageous. Likewise, while several specific implementation details are included in the above discussion, these should not be construed as limitations on the scope of the disclosure. Certain features that are described in the context of separate embodiments may also be combined to be implemented in a single embodiment. Conversely, various features that are described in the context of a single embodiment may also be implemented in multiple embodiments separately or in any suitable sub-combination.

Although the subject matter has been described in language specific to structural features and/or methodological actions, it should be understood that the subject matter defined in the appended claims is not necessarily limited to the specific features or actions described above. Rather, the specific features and actions described above are merely example forms of implementing the claims.

What is claimed is:

1. A method for browsing a table in a document, applied to an electronic device, comprising:
   in a process of editing a table in an online document, receiving a table page jump instruction of a first table and jumping from a document page corresponding to the online document to a first table page for display;
   receiving a table switching instruction in the first table page; and
   switching from the first table page to a second table page for display according to the table switching instruction;
   wherein the first table page is used to display the first content of the first table independently, and the second table page is used to display second content of a second table independently, and the first table and the second table are tables which have been inserted in the online document, wherein first content of the first table is displayed in the document page, and second content of the second table is displayed in the document page, wherein content, other than the first content of the first table, in the document page where the first table is located is not displayed in the first table page, and content, other than the second content of the second table, in the document page where the second table is located is not displayed in the second table page.

2. The method according to claim 1, wherein the receiving the table page jump instruction of the first table and jumping from the document page corresponding to the online document to the first table page for display comprises:
   receiving, in the document page, a table editing trigger instruction of the first table, generating a first editing operation area at a position matching the table editing trigger instruction and displaying the first editing operation area;
   receiving the table page jump instruction of the first table in the first editing operation area; and
   generating the first table page according to the table page jump instruction of the first table, and displaying the first table page.

3. The method according to claim 2, wherein the generating the first table page according to the table page jump instruction of the first table comprises:
   acquiring a position sequence of each table of the document page in the document page respectively;
   generating a corresponding table identification area for each table, and determining an arrangement sequence of the table identification area corresponding to each table according to the position sequence, wherein data in the table identification area is used to identify the corresponding table;
   arranging each table identification area according to the arrangement sequence to form a table switching area; wherein the table switching instruction is an instruction input for the table identification area, and is used to switch to a table page to which the table corresponding to the table identification area belongs; and
   generating the first table page according to the first table and the table switching area.

4. The method according to claim 1, wherein before receiving the table page jump instruction of the first table, the method further comprises:
receiving a table inserting instruction in the document page;
generating a table at a position matching the table inserting instruction in the document page according to the table inserting instruction.

5. The method according to claim 4, wherein after generating the table at the position matching the table inserting instruction in the document page, the method further comprises:
receiving a table title naming instruction for the table; and
generating a title text of the table at a title position matching the table according to the table title naming instruction and displaying the title text.

6. The method according to claim 1, wherein after jumping from the document page corresponding to the online document to the first table page for display, and before switching from the first table page to the second table page for display according to the table switching instruction, the method further comprises:
receiving a document page jump instruction in a second editing operation area of the first table page, and jumping from the first table page to the document page for display.

7. The method according to claim 1, wherein data inserted in the first table includes at least one of the following: text, an image, audio and video.

8. The method according to claim 1, wherein the table page jump instruction comprises a full screen control.

9. An apparatus for browsing a table in a document, comprising: a memory, a processor, and a computer program stored on the memory and executable on the processor, wherein when the processor executes the computer program, the processor is caused to:
receive a table page jump instruction of a first table in a process of editing a table in an online document, and jump from a document page corresponding to the online document to a first table page for display;
receive a table switching instruction in the first table page; and
switch from the first table page to a second table page for display according to the table switching instruction; wherein the first table page is used to display the first content of the first table independently, the second table page is used to display second content of a second table independently, and the first table and the second table are tables which have been inserted in the online document, wherein first content of the first table is displayed in the document page, and second content of the second table is displayed in the document page, wherein content, other than the first content of the first table, in the document page where the first table is located is not displayed in the first table page, and content, other than the second content of the second table, in the document page where the second table is located is not displayed in the second table page.

10. The apparatus according to claim 9, wherein the processor is further caused to:
receive, in the document page, a table editing trigger instruction of the first table, generate a first editing operation area at a position matching the table editing trigger instruction and display the first editing operation area;
receive the table page jump instruction of the first table in the first editing operation area;
generate the first table page according to the table page jump instruction of the first table, and display the first table page.

11. The apparatus according to claim 10, wherein the processor is further caused to:
acquire a position sequence of each table of the document page in the document page respectively;
generate a corresponding table identification area for each table, and determine an arrangement sequence of the table identification area corresponding to each table according to the position sequence, wherein data in the table identification area is used to identify the corresponding table;
arrange each table identification area according to the arrangement sequence to form a table switching area; where the table switching instruction is an instruction input for the table identification area, and is used to switch to a table page to which the table corresponding to the table identification area belongs; and
generate the first table page according to the first table and the table switching area.

12. The apparatus according to claim 9, wherein the processor is further caused to:
receive a table inserting instruction in the document page before the table page jump instruction of the first table is received; and
generate a table at a position matching the table inserting instruction in the document page according to the table inserting instruction.

13. The apparatus according to claim 12, wherein the processor is further caused to:
receive a table title naming instruction for the table after the table is generated at the position matching the table inserting instruction in the document page;
generate a title text of the table at a title position matching the table according to the table title naming instruction and display the title text.

14. The apparatus according to claim 9, wherein the processor is further caused to: after the document page corresponding to the online document is jumped to the first table page for display and before the first table page is switched to the second table page for display according to the table switching instruction, receive a document page jump instruction in a second editing operation area of the first table page and jump from the first table page to the document page for display.

15. The apparatus according to claim 9, wherein data inserted in the first table includes at least one of the following: text, an image, audio and video.

16. A non-transitory computer-readable storage medium, wherein the computer-readable storage medium has a computer-executable instruction stored thereon, and when a processor executes the computer-executable instruction, the processor is configured to:
in a process of editing a table in an online document, receive a table page jump instruction of a first table and jumping from a document page corresponding to the online document to a first table page for display;
receive a table switching instruction in the first table page; and
switch from the first table page to a second table page for display according to the table switching instruction; wherein the first table page is used to display the first content of the first table independently, and the second table page is used to display second content a second table independently, and the first table and the second table are tables which have been inserted in the online document, wherein first content of the first table is displayed in the document page, and second content of the second table is displayed in the document page, wherein content, other than the first content of the first table, in the document page where the first table is located is not displayed in the first table page, and content, other than the second content of the second table, in the document page where the second table is located is not displayed in the second table page.

17. The non-transitory computer-readable storage medium according to claim 16, wherein the processor is further configured to:
receive, in the document page, a table editing trigger instruction of the first table, generate a first editing operation area at a position matching the table editing trigger instruction and display the first editing operation area;
receive the table page jump instruction of the first table in the first editing operation area;
generate the first table page according to the table page jump instruction of the first table, and display the first table page.

18. The non-transitory computer-readable storage medium according to claim 16, wherein the processor is further configured to:
receive a table inserting instruction in the document page before the table page jump instruction of the first table is received; and
generate a table at a position matching the table inserting instruction in the document page according to the table inserting instruction.

19. The non-transitory computer-readable storage medium according to claim 16, wherein the processor is further configured to:
after the document page corresponding to the online document is jumped to the first table page for display and before the first table page is switched to the second table page for display according to the table switching instruction, receive a document page jump instruction in a second editing operation area of the first table page and jump from the first table page to the document page for display.

* * * * *